United States Patent
Shi

(10) Patent No.: US 8,119,083 B2
(45) Date of Patent: Feb. 21, 2012

(54) MULTIPHASE REACTOR

(76) Inventor: Hanxiang Shi, Cixi (CN)

( * ) Notice: Subject to any disclaimer, the term of this patent is extended or adjusted under 35 U.S.C. 154(b) by 1147 days.

(21) Appl. No.: 10/563,144

(22) PCT Filed: Oct. 16, 2003

(86) PCT No.: PCT/CN03/00862
§ 371 (c)(1), (2), (4) Date: Sep. 14, 2006

(87) PCT Pub. No.: WO2005/000451
PCT Pub. Date: Jan. 6, 2005

(65) Prior Publication Data
US 2007/0183948 A1    Aug. 9, 2007

(30) Foreign Application Priority Data
Jun. 30, 2003 (CN) .................... 03 1 48026

(51) Int. Cl.
*B01J 8/00* (2006.01)
*B01J 19/00* (2006.01)
*B01J 19/32* (2006.01)

(52) U.S. Cl. ........ 422/630; 422/644; 422/645; 422/228; 366/336; 366/338; 366/341

(58) Field of Classification Search .......... 422/630, 422/644, 645, 228; 366/336, 338, 341
See application file for complete search history.

(56) References Cited

U.S. PATENT DOCUMENTS

| | | | | |
|---|---|---|---|---|
| 2,535,944 A | * | 12/1950 | Mathy | 422/638 |
| 3,523,762 A | * | 8/1970 | Broughton | 422/191 |
| 5,741,466 A | * | 4/1998 | Bodnaras | 422/228 |
| 5,800,791 A | * | 9/1998 | Ainscow et al. | 422/228 |

FOREIGN PATENT DOCUMENTS

| | | | |
|---|---|---|---|
| CN | 1347751 A | | 5/2002 |
| EP | 344032 A1 | * | 11/1989 |
| EP | 0879636 A | | 11/1998 |
| JP | 2001293330 A | | 10/2001 |

OTHER PUBLICATIONS

International Search Report for International Application No. PCT/CN03/00862.

* cited by examiner

*Primary Examiner* — Jennifer A Leung
(74) *Attorney, Agent, or Firm* — Tucker Ellis & West LLP

(57) ABSTRACT

This invention relates to a multiphase reactor which is especially suitable for desulfurization of flue gas. A rotary build-in member comprising a axisymmetric body and an annular axisymmetric body is fixed on the shell of the reactor. The shell is cylindrical, and its surface is smooth or waved. The maximum diameter of the axisymmetric body is no less than the inner diameter of the annular axisymmetric body. The axisymmetric body is installed on the annular axisymmetric body coaxially. One rotary build-in member and its corresponding shell constitute an unit, and the reactor may have one or more such units. The multiphase reactor can effectively improve the flow pattern of the fluid and the contact of gas-liquid-solid three-phase of the reactants, speed up the mass transfer, and prevent deposition of the solid phase. The reactor is simple in structure and convenient for use. It can be used in the fields such as environmental protection, chemical engineering, metallurgy, and architectural industries.

10 Claims, 3 Drawing Sheets

Prior Art

MULTIPHASE REACTOR

FIELD OF THE INVENTION

This invention relates to a multiphase reactor, particularly, to a gas-liquid-solid or gas-liquid, gas-solid, liquid-solid multiphase reactor.

BACKGROUND OF THE INVENTION

Multiphase reactors are widely used in various industry sectors such as metallurgy, chemical engineering, petrochemical engineering, and environmental protection. Owing to the particularity of different application fields, the reactor components that speed up reactions among gas-liquid-solid three-phase or gas-liquid, gas-solid, liquid-solid two-phase should have their own characteristics, according to practical requirements. For instance, the Chinese patent No. ZL98113470.x, entitled "A Multiphase Jet Osmotic Dissolution reactor", discloses a reactor including a spherical perforated focused injector, a draft tube, an expanding vessel and an osmotic cavity. Its characteristics are that the small conical orifices on the surface of the spherical body of the spherical perforated focused injector are connected to transferring conduits of the multiphase-fluid, respectively; the expanding vessel consists of a cone-shaped cavity and an expanding cone, with clearance between them; there are cylindrical orifices with convex helical bore line on the top end of the small conical orifices of the spherical body, and there is a short inward convex helical bore line on the inner wall of the draft tube terminal. Aiming at improving the osmotic effect of at least two-phase fluids, this prior art invention is made with its own characteristics of a build-in member. The inventor of the present application had presented a set of new technical solutions in the process of solving pollution problems of sulfur dioxide-containing flue gas which was discharged during metallurgical processes, achieving the object of "waste treats waste, waste to wealth." For the said new technical solutions, two Chinese patent applications concerning processes and main apparatuses have been filed with the Chinese Patent Office respectively, with the patent application number 00119453.4 and 02203582.6. In addition, a Chinese application for patent for invention had also been filed, with the patent application number 01126707.0. The patent for utility model No. ZL02203582.6, with the title of "A Multiphase Reactor" had been granted. The patent ZL02203582.6 is mainly concerned about a cone-shaped build-in member, composed of a cone-shaped ring and a cone body, which is mounted inside the reactor. Owing to the said build-in member, the velocity and direction of the fluids inside the reactor are forced to change continuously, so as to strengthen the contact among gas, liquid and solid phases and to improve the reaction process. Meanwhile, the build-in member can retard the deposition of solid materials in the reactor. This kind of build-in member is simple in structure, and can prevent corrosion and abrasion readily. The conical surfaces of the cone body and conical ring housing of this conical build-in member are rotation surfaces formed by rotating straight lines, as a generatrix, round a rotation axis. However, these rotation surfaces can hardly fit for complicated practical situations. If the generatrix is changed from straight lines to a curved line as required, then the curved line is rotated round the rotation axis to form rotation surfaces, the axisymmetric body and annular axisymmetric body, which are formed by the above-mentioned rotation surfaces, replace the previous cone body and conical ring; the rotary build-in member, comprised of the axisymmetric body and the annular axisymmetric body, replace the previous conical build-in member. The rotary build-in member can effectively improve the flow pattern of the fluids and improve the contact among gas, liquid and solid phases of the reactants, and speed up the mass transfer Therefore, the multiphase reactor could fit with more situations, and could be employed in even more three-phase or two-phase reactions.

SUMMARY OF THE INVENTION

The object of this invention is to provide a multiphase reactor with a simple structure and an enhanced reaction strength, without dead angles, deposition nor congestion of the solid phase.

The object of this invention is achieved as follows: based on the teachings of the Chinese patent for utility model No. ZL02238264.X, according to which the cone body and conical ring which constitute the conical build-in member and were formed by rotating straight line or poly-line round a rotation axis, are changed into anaxisymmetric body and an annular axisymmetric body which are formed by rotating a curved line round a rotation axis as required, the curved line may also include a part of straight line and/or curved line, so as to satisfy different requirements of various reactions. Meanwhile, in order to enhance the maneuverability of the multiphase reactor during its operation, some improvements have been made, which are concerned about the molding of and connection between the shell, the axisymmetric body, and the annular axisymmetric body, as well as about the shape of the shell. The characteristics of the present multiphase reactor are as follows: a rotary build-in member, comprised of an axisymmetric body and an annular axisymmetric body, is installed inside the shell of the multiphase reactor. The shell of the reactor is cylindrical. The surface of the shell can be smooth, or can be waved transversely or longitudinally. The waved shape can be formed by a curved line or a poly-line. The shell of the reactor is cylindrical, and the inner surface of the shell is smooth, or waved transversely or longitudinally, wherein the shell with waved inner surface is formed by rotating a curved line or a poly-line round a rotation axis.

The axisymmetric body in the above mentioned rotary build-in member is formed by rotating the curved line, whose two ends are connected with the two ends of the rotation axis respectively and which is in the same plane with the rotation axis, round the rotation axis. It may be hollow with the required wall thickness, or may be solid. The annular axisymmetric body is formed by rotating a straight line and a curved line round the rotation axis, wherein the straight line is parallel to the rotation axis, and the two ends of the curved line are connected with the two ends of the straight line respectively, and the straight line, the curved line and the rotation axis are within one plane. The distance between the straight line and the rotation axis is longer than that between the curved line and the rotation axis, and is exactly equal to the radius of the inner wall of the shell. The annular axisymmetric body may be hollow. Even the cylindrical surface that is formed by rotating the straight line round the axis can be omitted, as long as the rotation surface formed by rotating the said curved line has the required wall thickness. It may also be a solid axisymmetric body.

The curved line, based on which the axisymmetric body and the annular axisymmetric body are formed, can be composed of curved line segments with different profiles, but these curved line segments are in the same plane with the rotation axis. The curved line is preferred to be simple and to form the rotation surfaces in ease. The top and the bottom ends of the annular axisymmetric body are connected to the shell so that the whole annular axisymmetric body is supported on the shell of the reactor, or can be integrated with the shell by molding. The axisymmetric body is supported on the shell of the reactor by a supporting frame, or can be integrated with the shell by molding. The annular axisymmetric body and the axisymmetric body are installed coaxially in the reactor. The maximum diameter of the axisymmetric body should not be less than the inner diameter of the annular axisymmetric body. Normally, the axisymmetric body is installed over the annular axisymmetric body with an appropriate distance between them, so as to make sure that there is enough space for feedstocks to pass through.

An axisymmetric body, an annular axisymmetric body and their corresponding shell constitute a reaction unit. A multiphase reactor can comprise one reaction unit or several reaction units. In the process of manufacturing, assembly, and installation of the reaction units, the shell, the axisymmetric body, and the annular axisymmetric body can be produced separately, then the axisymmetric body and the annular axisymmetric body are installed in order to the shell by welding, riveting, screwing, or bolting, in compliance with the requirements. Alternatively, the finished axisymmetric body and annular axisymmetric body can be installed to a corresponding section of the shell, then the sections of the shell are installed together by welding, riveting, screwing, flanged connection, or bell and spigot joint. In a third way, the axisymmetric body, the annular axisymmetric body and the corresponding section of the shell are made as an unit in a way of one-shot molding, then the sections of the shell are installed together by welding, riveting, screwing, flanged connection, or bell and spigot joint. In a fourth way, the axisymmetric body and a corresponding section of the shell are installed together in a way of one-shot molding, and the annular axisymmetric body and its corresponding section of the shell are installed together in a way of one-shot molding, then the two parts above-mentioned are connected together into a unit by welding, riveting, screwing, flanged connection, or bell and spigot joint; finally, all of units are connected together.

This invention possesses the following merits:

1. The previous structure of cone-shaped build-in member is replaced by the structure of a rotary build-in member, and the previous conical surface is replaced by a rotary surface. During the design of the reactor, the flow pattern of the fluid can be controlled by selecting the form of the rotary surface, so as to improve reaction process.

2. The previous structure of the conical build-in member is kept, so that several fluid curtains with different diameters are formed in the reactor. The previous build-in member is kept, so that the velocities and directions of the fluid are forced to change continuously. These measures improve the contact of gas-liquid-solid three-phase and enhance the reactions among different phases.

3. The structure of the rotary build-in member is basically the same as the structure of the conical build-in member except the rotary surface of the build-in member. Nevertheless this difference does not make the structure of the reactor complicated, and the characteristics such as simple in structure, easy manufacturing and low cost are remained.

4. A variety of methods concerning the connection and combination of the units or components are provided to the user's option when implementing this invention.

Figure 1:
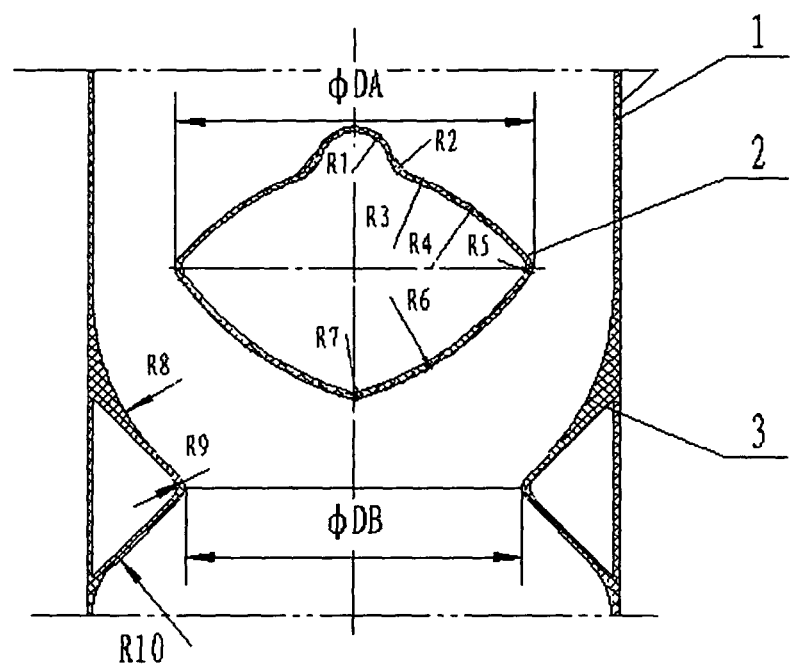
FIG. 1 shows a partial cross-section and its three-dimensional view of one embodiment of the multiphase reactor of the invention.
Figure 1:
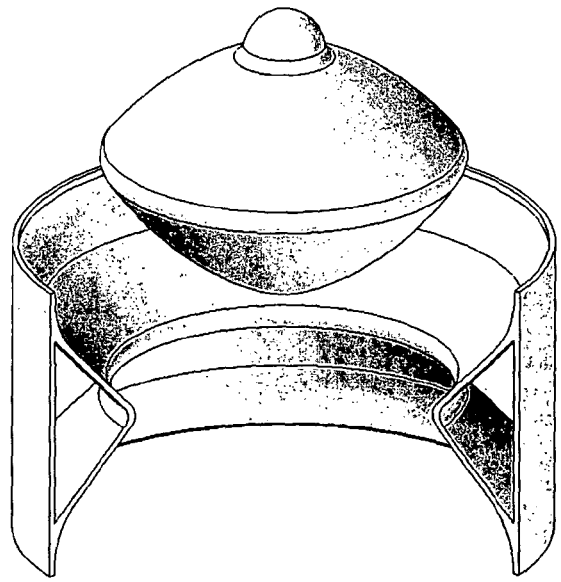
Figure 2:
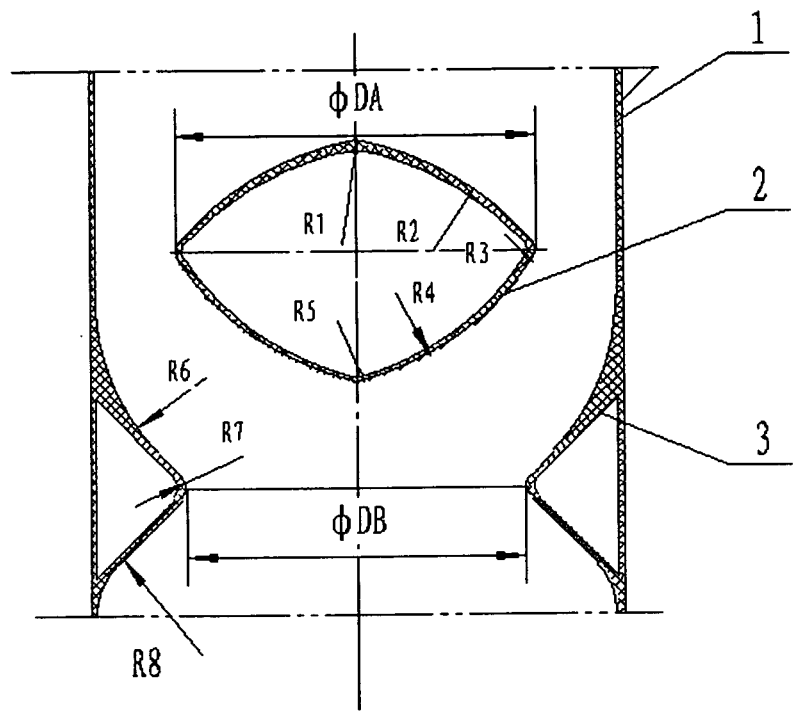
FIG. 2 shows the partial cross-section and its three-dimensional view of another embodiment of the multiphase reactor of the invention.
Figure 2:
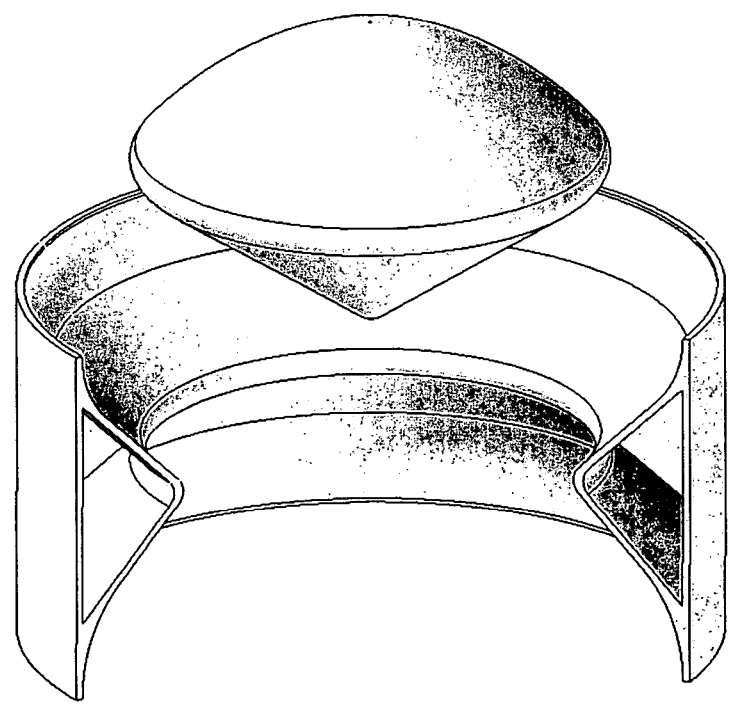
Figure 3:
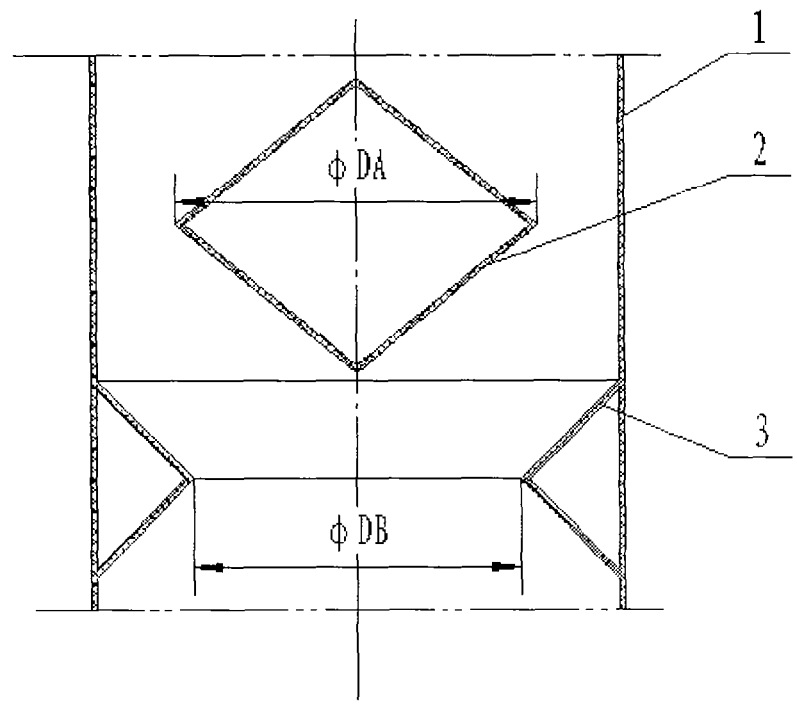
FIG. 3 shows the partial cross-section and its three-dimensional view of the multiphase reactor known from the prior art.
Figure 3:
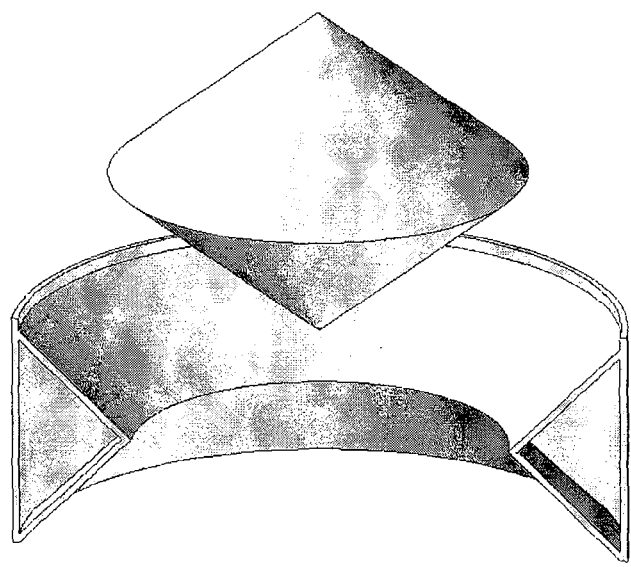

The differences between the multiphase reactor of the present invention and the prior art multiphase reactor are shown clearly in the FIG. 1, FIG. 2 and FIG. 3. The axisymmetric body and annular axisymmetric body of the multiphase reactor of the present invention are formed by rotating curved lines, which are in the same plane with the rotation axis. However, the cone body and the conical ring in the cone-shaped build-in member are formed by rotating a straight line or poly-line, which is in the same plane with the axis.

EMBODIMENTS

The following is the detailed description of embodiments referring to the Figures.

Example 1

As shown in FIG. 1, the multiphase reactor includes a shell and a rotary build-in member. The shell 1 of the reactor can be made as a cylinder with smooth surface. The rotary build-in member, consisted of the axisymmetric body 2 and the annular axisymmetric body 3, is installed inside the shell 1. The axisymmetric body 2 is formed by rotating the curved line which is formed by connecting several arcs with different radii. It is obviously different from the cone in FIG. 3. The annular axisymmetric body is also formed by rotating the curved line, which is formed by connecting several arcs with different radii, and is different from the conical ring in FIG. 3. The annular axisymmetric body 3 can be welded or riveted on the shell 1 of the reactor, and the axisymmetric body 2 is supported on the shell 1 by a fixed bolster. The axisymmetric body is mounted on the annular axisymmetric body with enough space left in between, whereby the fluids can flow through smoothly. The diameter of the axisymmetric body 2 $\phi DA$ is not less than the inner diameter $\phi DB$ of the annular axisymmetric body, so as to strengthen the change of the fluid velocity and to speed up the mass transfer. This type of structure is suitable for the counter-current contact of the downward feedstock slurry and the upward gaseous fluid, and also suitable for the co-current contact of the feedstock slurry and the gaseous fluid simultaneously downward.

Example 2

As shown in FIG. 2, the multiphase reactor includes a shell and a rotary build-in member. The shell 1 of the reactor can be manufactured into a cylinder shape, the rotary build-in member, composed of the axisymmetric body 2 and the annular axisymmetric body 3, is installed inside the shell 1. The axisymmetric body 2, formed by rotating another curved line, has the shape that is different from the cone body shown in FIG. 3 and the axisymmetric body shown in FIG. 1. The annular axisymmetric body 3, formed by rotating another curved line, has the shape that is different from the conical ring shown in FIG. 3 and the annular axisymmetric body shown in FIG. 1. The axisymmetric body is mounted on the annular axisymmetric body with enough space left in between, whereby the fluids can flow through smoothly. The diameter $\phi DA$ of the axisymmetric body 2 is not less than the inner diameter $\phi DB$ of the annular axisymmetric body, so as to strengthen the change of the fluid velocity and to speed up the mass transfer. This type of structure is suitable for the counter-current contact of the downward feedstock slurry and the upward gaseous fluid, and also suitable for the co-current contact of the feedstock slurry and the gaseous fluid simultaneously downward.

As an embodiment of the present invention, Ningbo East Copper Company Smeltery modified its previously used cone-shaped build-in member as shown in FIG. 3 by using the rotary build-in member as shown in FIG. 2. Under the substantially same operation conditions, the recycling slurry was decreased by 6%, indicating that the change of the shape of the build-in member conduces to intensifying the contact of the gas-liquid-solid three phases, and to speeding up the mass transfer.

The above embodiments describe one technical solution of the present invention. Some technical modifications based on the present invention without departure from the spirits of inventive concept, such as those being added with some radial troughs on the surface of the axisymmetric body and annular axisymmetric body, etc., are all within the protection scope of the invention.

What is claimed is:

1. A multiphase reactor configured to facilitate contact between first and second fluids flowing through the multiphase reactor, the multiphase reactor comprising:
   a reactor shell;
   an axisymmetric body disposed within the reactor shell and being axisymmetric relative to an axis; and,
   an annular axisymmetric body disposed on an inside surface of the reactor shell, and being axisymmetric about the axis,
   wherein the axisymmetric body, the annular axisymmetric body, and the reactor shell are integrated together to form a unit,
   wherein the axisymmetric body is formed by rotating a single curved line without a straight line portion and comprised of at least two curved portions having different radii, as a generatrix, around the axis,
   wherein several of the units are mounted in the reactor from the top to the bottom.

2. A multiphase reactor according to claim 1, wherein the said reactor shell is cylindrical with a one of a smooth inner surface, or an inner surface waved transversely or longitudinally, and the waved inner surface is formed by rotating a curved line or a polyline as a generatrix around the axis.

3. A multiphase reactor according to claim 1, wherein:
   the annular axisymmetric body is formed by rotating a straight line and a curved line as a generatrix around the axis, wherein the straight line is parallel to the axis, and the two ends of the curved line are connected with the two ends of the straight line respectively, and the straight line and the curved line are within the same plane, the curved line is with the exception of straight lines;
   a distance between the straight line and the rotation axis is longer than a distance between the curved line and the rotation axis;
   the axisymmetric body is mounted relative to the annular axisymmetric body, and is formed by rotating the single curved line around the axis, the two ends of the single curved line being connected with two spaced points on the axis respectively, and the single curved line and the axis being within the same plane; and,
   the axisymmetric body and the annular axisymmetric body are coaxial.

4. A multiphase reactor according to claim 1, wherein a maximum diameter $\Phi DA$ of said axisymmetric body is not less than an inner diameter of the annular axisymmetric body $\Phi DB$.

5. A multiphase reactor according to claim 1 wherein the reactor shell, the axisymmetric body and the annular axisymmetric body are manufactured separately, then installed as desired by welding, riveting, screwing or bolting; or installed as a reaction unit in a way of one-spot molding; or the axisymmetric body and a corresponding section of the shell are installed together in a way of one-shot molding as a first part, and the annular axisymmetric body and its corresponding section of the shell are installed together in a way of one-shot molding as a second part, then the first and second parts are connected together into an unit by welding, riveting, screwing, flanged connection, or by bell and spigot joint.

6. A multiphase reactor according to claim 1, wherein the units are connected together in order by welding, riveting, bolting, flanged connection, or by bell and spigot joint.

7. A multiphase reactor configured to facilitate contact between first and second fluids flowing through the multiphase reactor, the multiphase reactor comprising:
   a cylindrical reactor shell having a smooth cylindrical inner surface;
   an annular body member disposed on the inner surface of the cylindrical reactor shell; and,
   a rotator body member disposed within the cylindrical reactor shell and being arranged coaxially relative to the annular body member along an axis, wherein the rotator body member overlaps the annular body member in a direction of the axis, and wherein the rotator body member overlaps the smooth inner surface of the cylindrical reactor shell in the direction of the axis,
   wherein the annular body member is axisymmetric relative to the axis,
   wherein the rotator body member is axisymmetric relative to the axis,
   wherein the axisymmetric rotator body member is formed by rotating a single curved line without a straight line portion and comprised of at least two curved portions having different radii, as a generatrix, around the axis,
   wherein the axisymmetric annular body member and the axisymmetric rotator body member collectively form an integrated rotary built-in member,
   wherein a plurality of the integrated rotary built-in members are arranged relative to the cylindrical reactor shell along the axis.

8. The multiphase reactor according to claim 7, wherein:
   the axisymmetric annular body member is formed by rotating a straight line and a curved line without a straight line portion as a generatrix, around the axis, wherein the straight line is parallel with the axis, and the two terminal ends of the curved line are connected with the two terminal ends of the straight line, respectively.

9. A multiphase reactor configured to facilitate contact between first and second fluids flowing through the multiphase reactor, the multiphase reactor comprising:
   a cylindrical reactor shell having a smooth cylindrical inner surface;
   an annular body member disposed on the inner surface of the cylindrical reactor, shell, the annular body member having an inner diameter $\Phi DB$; and,
   a rotator body member disposed within the cylindrical reactor shell and being arranged coaxially relative to the annular body member along an axis with a selected distance between the rotator body member and the annular body member to permit associated feedstock to pass through the multiphase reactor, wherein the rotator body member overlaps the annular body member in a direction of the axis, and wherein the rotator body member has an outer diameter $\Phi DA$ being greater than the inner diameter $\Phi DB$ of the annular body member, wherein:

the annular body member is axisymmetric relative to the axis;

the rotator body member is axisymmetric relative to the axis;

the axisymmetric rotator body member is formed by rotating a single curved line without a straight line portion and comprised of at least two curved portions having different radii, as a generatrix, around the axis;

the axisymmetric annular body member and the axisymmetric rotator body member collectively form an integrated rotary built-in member; and, a plurality of the integrated rotary built-in members are arranged relative to the cylindrical reactor shell along the axis.

10. The multiphase reactor according to claim 9, wherein:

the axisymmetric annular body member is formed by rotating a straight line and a curved line without a straight line portion as a generatrix, around the axis, wherein the straight line is parallel with the axis, and the two terminal ends of the curved line are connected with the two terminal ends of the straight line, respectively.

* * * * *